US012092215B2

(12) United States Patent
Miller et al.

(10) Patent No.: US 12,092,215 B2
(45) Date of Patent: Sep. 17, 2024

(54) PRESS-IN-PLACE REINFORCED SEAL

(71) Applicant: GM GLOBAL TECHNOLOGY OPERATIONS LLC, Detroit, MI (US)

(72) Inventors: Ronald Miller, Bloomfield Hills, MI (US); Bhaskara K Ch, Karnataka (IN); Margarita M. Mann, Royal Oak, MI (US); Edward J Billings, Ann Arbor, MI (US); Krishna Garapati, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 50 days.

(21) Appl. No.: 18/076,791

(22) Filed: Dec. 7, 2022

(65) Prior Publication Data

US 2024/0191797 A1 Jun. 13, 2024

(51) Int. Cl.
*F16J 15/08* (2006.01)
(52) U.S. Cl.
CPC .............................. *F16J 15/0818* (2013.01)
(58) Field of Classification Search
CPC .... F16J 15/12; F16J 15/10; F16J 15/06; F16J 15/0818
See application file for complete search history.

(56) References Cited

U.S. PATENT DOCUMENTS 3,578,346 A * 5/1971 Jelinek .................... F16L 23/22
277/611
3,635,480 A * 1/1972 Bain ...................... F16J 15/123
277/651
3,930,656 A * 1/1976 Jelinek .................... F16L 23/18
277/611
4,026,565 A * 5/1977 Jelinek .................... F16L 23/22
285/368
4,114,906 A * 9/1978 Jelinek .................... F16J 15/121
277/596
5,011,162 A * 4/1991 Jelinek .................... F16B 43/001
411/542

(Continued)

FOREIGN PATENT DOCUMENTS

JP   2003056704 A * 2/2003   ........... F16J 15/0818
JP   2006029588 A * 2/2006   ........... F16J 15/0818
(Continued)

*Primary Examiner* — Eugene G Byrd
(74) *Attorney, Agent, or Firm* — Quinn IP Law

(57) ABSTRACT

A press-in-place reinforced seal for an interface between adjacent components, includes a cylindrical structure arranged along a longitudinal axis and characterized by a stepped-shape in a cross-sectional view. The seal is pressed into a first component and compressed by a second component when the seal is installed within the interface. The stepped-shape includes a compliant first section having a first width along the longitudinal axis and a first length orthogonal to the longitudinal axis. The first section is compressed by the second component and generates sealing pressure between the first and second components when the seal is installed. The stepped-shape also includes a rigid second section affixed to the first section along the first length for stabilizing the seal structure. The second section has a second width along the longitudinal axis and a second length orthogonal to the longitudinal axis and greater than the first length.

20 Claims, 4 Drawing Sheets

(56) References Cited

U.S. PATENT DOCUMENTS

| | | | | |
|---|---|---|---|---|
| 5,145,190 | A * | 9/1992 | Boardman | F16J 15/104 |
| | | | | 277/596 |
| 5,735,529 | A * | 4/1998 | Lawrence | F16J 15/123 |
| | | | | 277/596 |
| 6,241,253 | B1 * | 6/2001 | Dempsey | F16J 15/104 |
| | | | | 277/650 |
| 9,551,422 | B2 * | 1/2017 | Bond | F16J 15/121 |
| 9,562,609 | B2 * | 2/2017 | Shimazoe | H01M 8/0258 |
| 10,608,260 | B2 * | 3/2020 | Horimoto | H01M 8/242 |
| 2002/0135137 | A1 * | 9/2002 | Hammi | B64D 37/005 |
| | | | | 277/637 |
| 2004/0212157 | A1 * | 10/2004 | Bohringer | F16J 15/062 |
| | | | | 277/645 |
| 2006/0269818 | A1 * | 11/2006 | Inoue | H01M 8/026 |
| | | | | 429/514 |
| 2015/0292433 | A1 * | 10/2015 | Klinner | F02F 11/002 |
| | | | | 277/592 |
| 2016/0160794 | A1 * | 6/2016 | Maccarrone | F16J 15/0825 |
| | | | | 123/193.5 |
| 2018/0245727 | A1 * | 8/2018 | Quesada | F16J 15/0818 |
| 2020/0219737 | A1 * | 7/2020 | Seo | H01L 21/67126 |
| 2020/0386313 | A1 * | 12/2020 | Hwang | F16J 15/0818 |
| 2021/0095764 | A1 * | 4/2021 | Vervaet | H01R 13/5202 |
| 2021/0404556 | A1 * | 12/2021 | Hagiwara | F16J 15/064 |
| 2022/0018436 | A1 * | 1/2022 | Lundstrom | F16J 15/0818 |
| 2022/0228663 | A1 * | 7/2022 | Zhao | F16J 15/0818 |

FOREIGN PATENT DOCUMENTS

| | | | | |
|---|---|---|---|---|
| JP | 2010190237 | A * | 9/2010 | |
| JP | 2013190055 | A * | 9/2013 | F02F 11/002 |

\* cited by examiner

PRESS-IN-PLACE REINFORCED SEAL

INTRODUCTION

The present disclosure relates to a reinforced press-in-place (PIP) seal, such as for an interface between components from dissimilar materials.

A gasket or seal is a mechanical component that fills the space between mating surfaces, generally to prevent leakage of a fluid from or into the joined objects while the seal is under compression. Seals permit "less-than-perfect" mating surfaces on machine parts to be joined without allowing leakage by using the gasket to fill surface irregularities. Seals also keep external contaminants out of the resultant assembly. Seals are commonly produced from sheet or molded materials such as paper, natural rubber, synthetic rubber, metal, or a plastic polymer.

In situations where a joint between two mating components is pressurized, or the mating components are constructed from dissimilar materials, sealing of such a joint becomes even more challenging. Additionally, in such joints, unintended fluid leakage may lead to functional failure of a system thus being sealed. Typically, such leakage may cause additional inconvenience by creating a fluid spill that necessitates a clean-up. Design and selection of a seal for a particular application may thus prove critical to the reliability of a subject system and to the satisfaction of the system's user.

SUMMARY

A press-in-place (PIP) reinforced seal for an interface between adjacent components, with the PIP seal including a cylindrical structure arranged along a longitudinal axis and characterized by a stepped-shape in a cross-sectional view. The cylindrical structure is configured to be pressed into a first component and be compressed by a second component when the seal is installed within the interface. The stepped-shape includes a first section having a first width arranged orthogonal to the longitudinal axis and a first length arranged along the longitudinal axis. The first section is constructed from a compliant material configured to be compressed by the second component. The compliant material first section is thereby configured to generate sealing pressure between the first and second components when the PIP seal is installed within the interface. The stepped-shape also includes a second section having a second width arranged orthogonal to the longitudinal axis and a second length arranged along the longitudinal axis. The second section is constructed from a rigid material and is affixed to the first section along the first length to thereby stabilize the cylindrical structure when the PIP seal is installed within the interface. The second length is greater than the first length.

The first section may include a leading surface at an intersection of the first width and the first length. The leading surface is configured to come into contact with the second component when the PIP seal is installed within the interface. The leading surface may be rounded in the cross-sectional view.

The compliant material may be Ethylene Propylene Diene Monomer (EPDM) rubber.

The rigid material may be one of metal and engineered plastic.

The compliant material may have Shore A-40 hardness.

The first section may be configured to come into contact with a fluid. The compliant material may be selected based on its chemical resistance to the fluid.

The fluid may be at least one of moist air, Hydrogen gas, and glycol-based coolant.

The cylindrical structure may have an over-molded construction with the first section over-molded on the second section.

The cylindrical structure may have a circular or oval contour in a plane orthogonal to the longitudinal axis.

The cylindrical structure may have an irregular contour in a plane orthogonal to the longitudinal axis.

A fluid-pressure joint assembly including first and second components and the press-in-place (PIP) seal for an interface therebetween.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
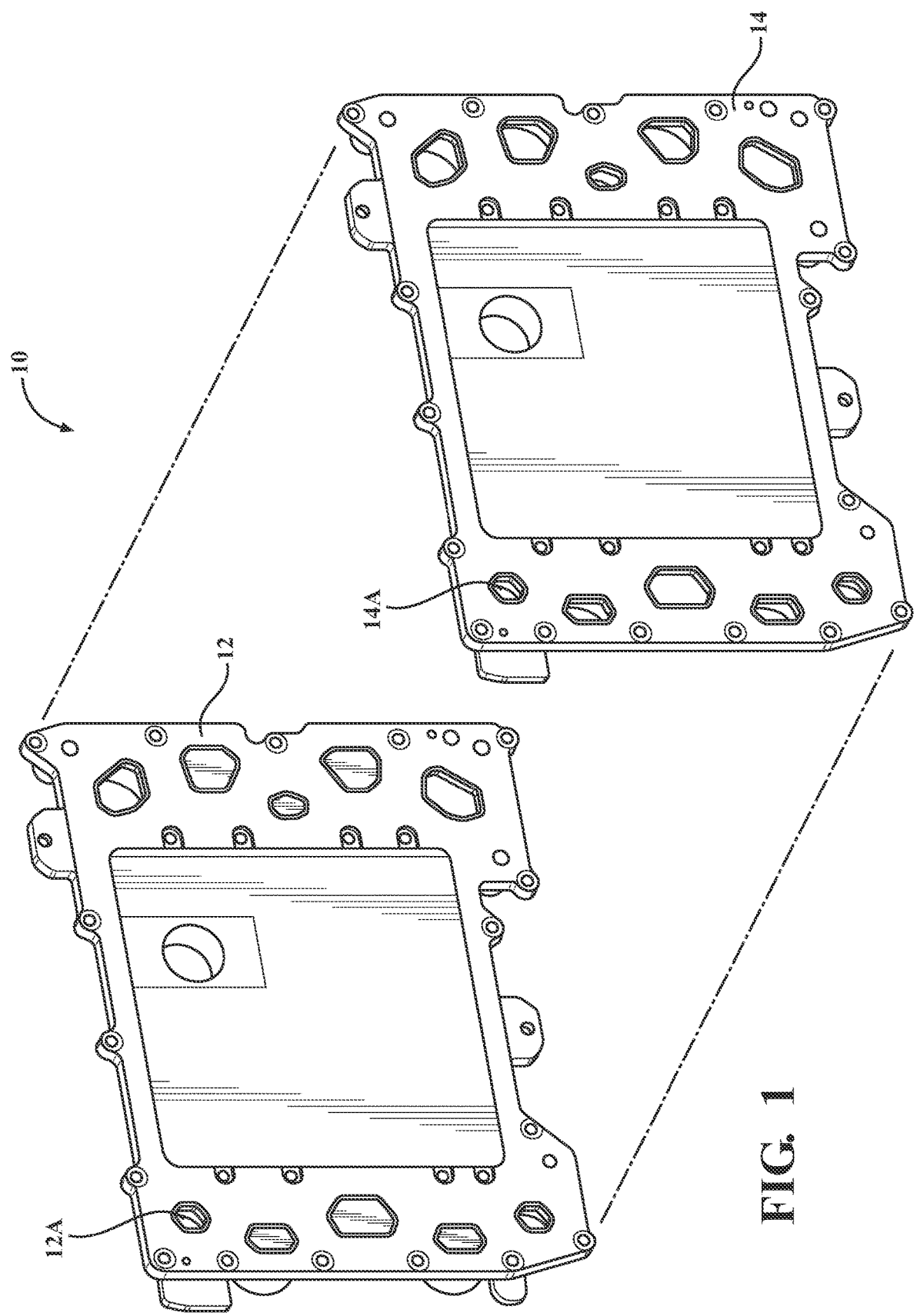
FIG. 1 is a schematic perspective view of an interface between adjacent components, according to the present disclosure.
Figure 6:
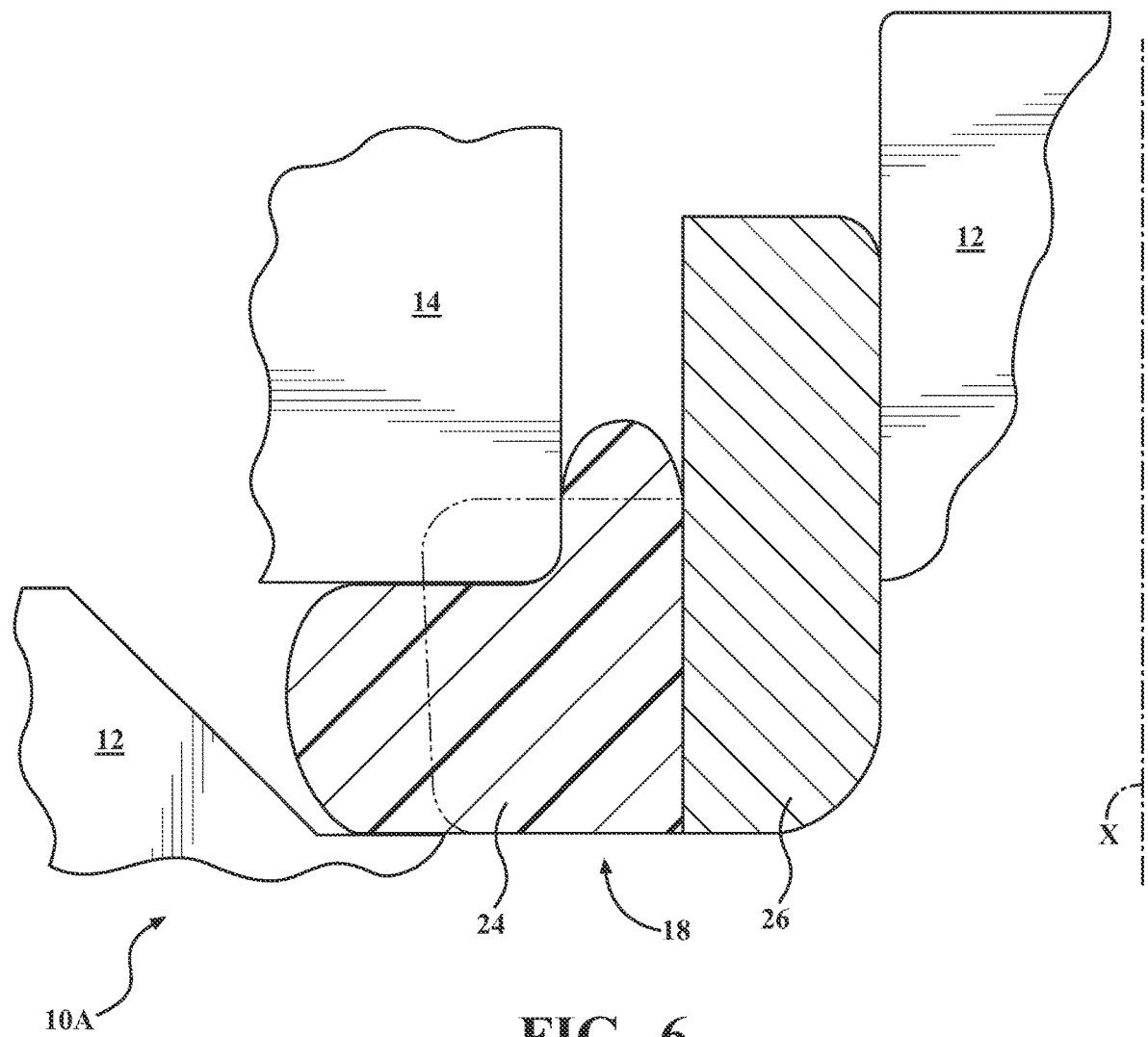
FIG. 6 is a schematic close-up cross-sectional side view of the PIP seal illustrated in an installed and compressed state within the interface between adjacent components shown in FIG. 1, according to the disclosure.

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Referring to the drawings, wherein like reference numbers refer to like components, FIG. 1 shows an assembly 10 adjacent components—a first component 12, and a second component 14. The assembly 10 includes a joint with an interface 10A (shown in FIG. 6) between components 12 and 14. The interface 10A may be configured to seal a pressurized fluid. Generally, the first component 12 and the second component 14 are fastened to each other to generate a robust assembly.

Figure 3:
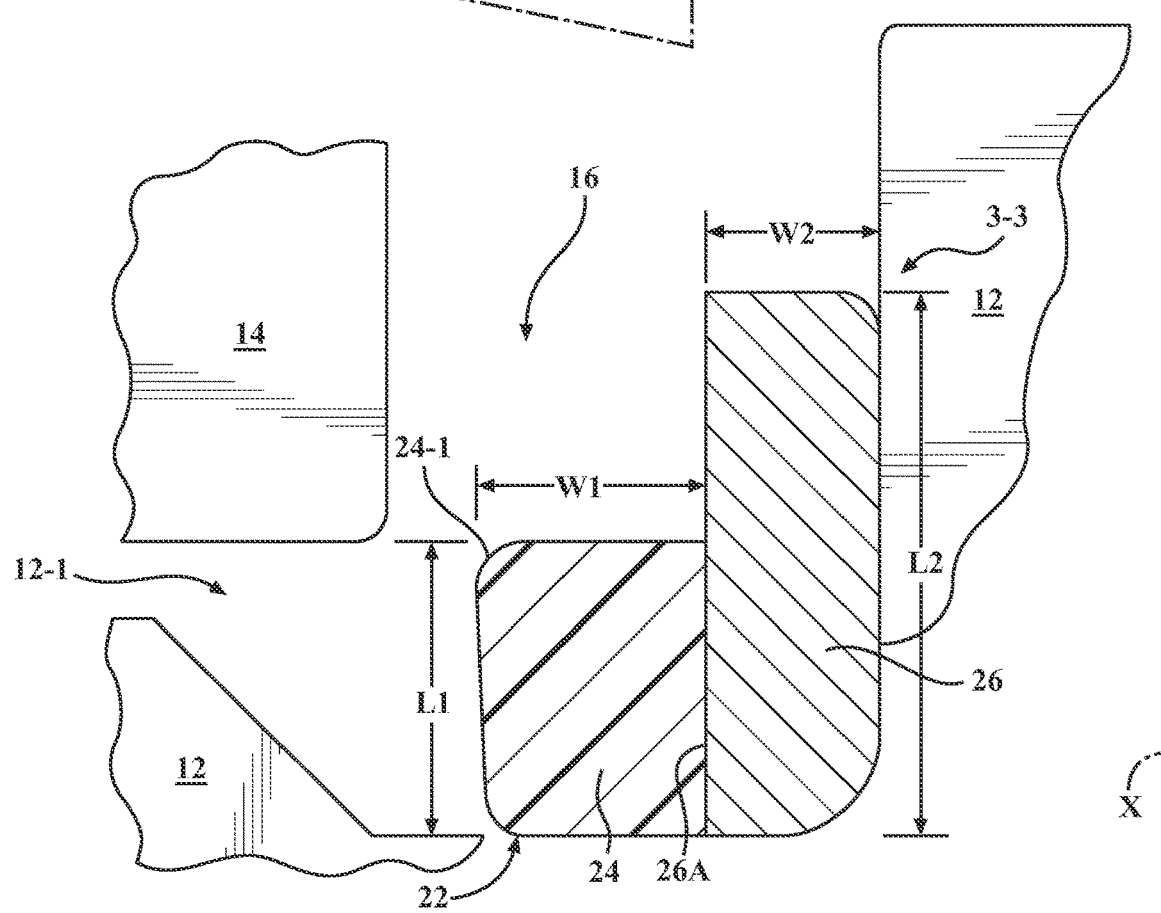
FIG. 3 is a schematic close-up cross-sectional side view of the PIP seal shown in FIG. 1, according to the disclosure.

As shown in FIG. 3, in a cross-sectional view the interface 10A includes a generally annular gap 16 between the first and second components 12, 14 configured to accept a press-in-place (PIP) seal 18 for sealing the interface. The gap 16 is generated between the first and second components 12, 14 when the first component is inserted into the second component. The PIP seal 18 is generally sandwiched and, in part, compressed within the gap 16 between the first and second components 12, 14 when the first and second components are fastened together. Controlled deformation of the PIP seal 18 is intended to generate sufficient sealing pressure at the interface 10A without excessive straining of the PIP seal material.

The first and second components 12, 14 may be constructed from different materials having dissimilar coefficients of thermal expansion, such as one of the two components being from metal and the other from plastic. During its operational life, the interface 10A may experience a considerable temperature gradient and gap variation. However, with the PIP seal 18 in place, the interface 10A is intended to withstand and seal considerable fluid pressure. In the assemblies employing the interface 10A with the intent of sealing pressurized fluid, the subject joint may be identified as a "fluid-pressure joint" and with the PIP seal 18 in place, the entire assembly may be identified as a "fluid-pressure joint assembly".

Typically, a joint is said to have a large gap variation when design and/or manufacturing tolerances of the mating components become a significant percentage of the thickness of the employed seal. In such a situation, under maximum material condition of the mating components, i.e., when such components are to their maximum allowable size, the actual compression of the seal in the assembled joint may exceed approximately 20-35% of its thickness, and lead to additional stress on those components. On the other hand, in such a situation under a minimum material condition of the mating components, i.e., when such components are at their minimum allowable size, compression of the seal may be less than ideally required to retain pressurized fluid without leakage.

Figure 2:
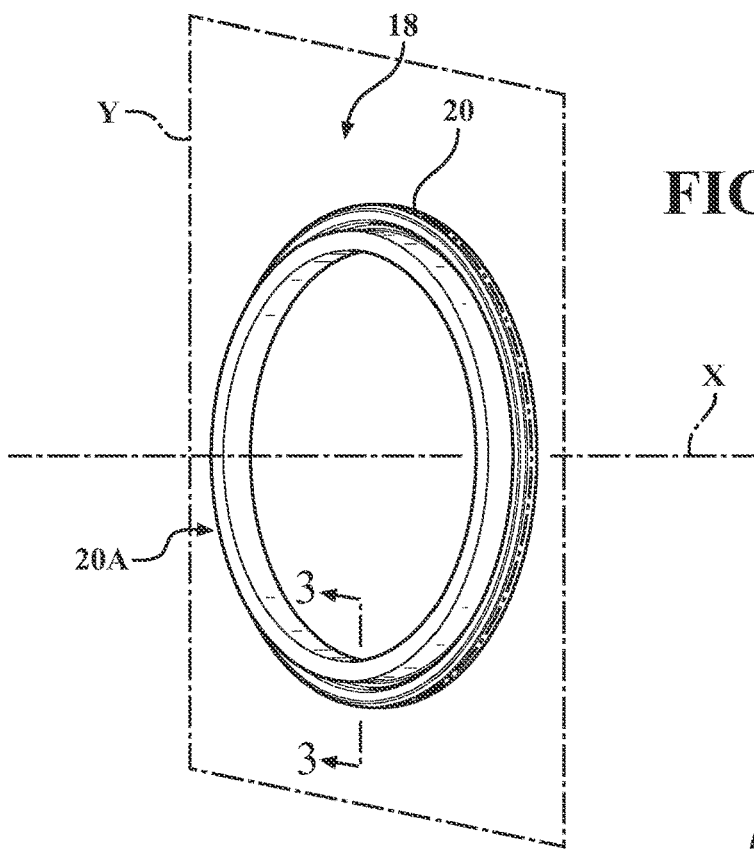
FIG. 2 is a schematic close-up perspective view of one embodiment of a reinforced press-in-place (PIP) seal for the interface shown in FIG. 1, according to the disclosure.
Figure 4:
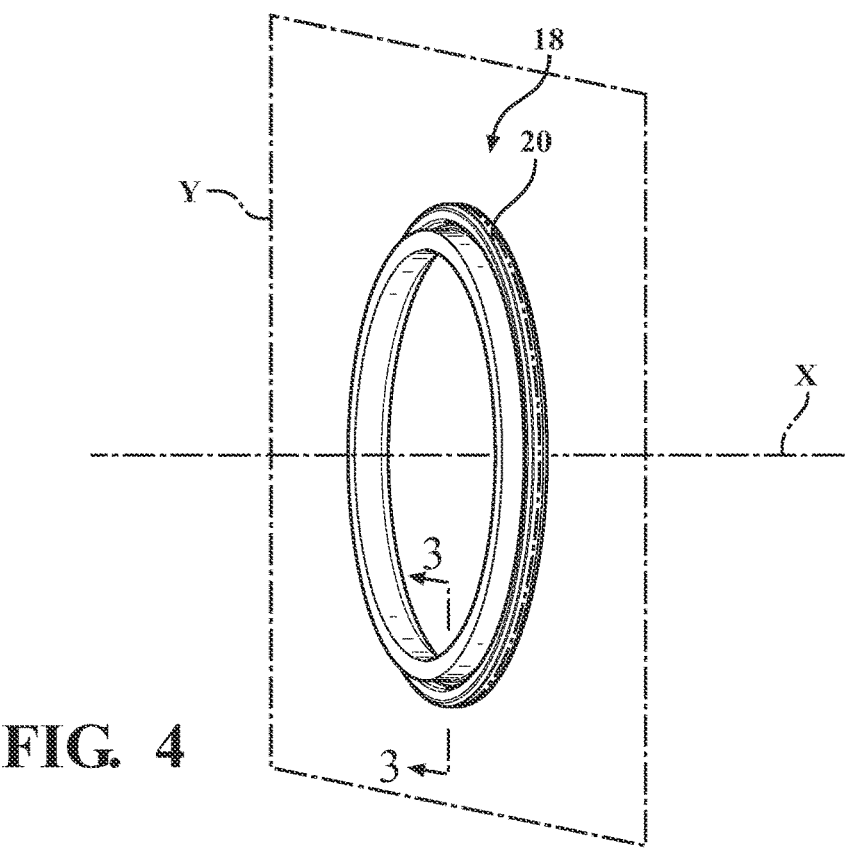
FIG. 4 is a schematic close-up perspective view of another embodiment of the PIP seal represented by the cross-sectional side view shown in FIG. 3, according to the disclosure.
Figure 5:
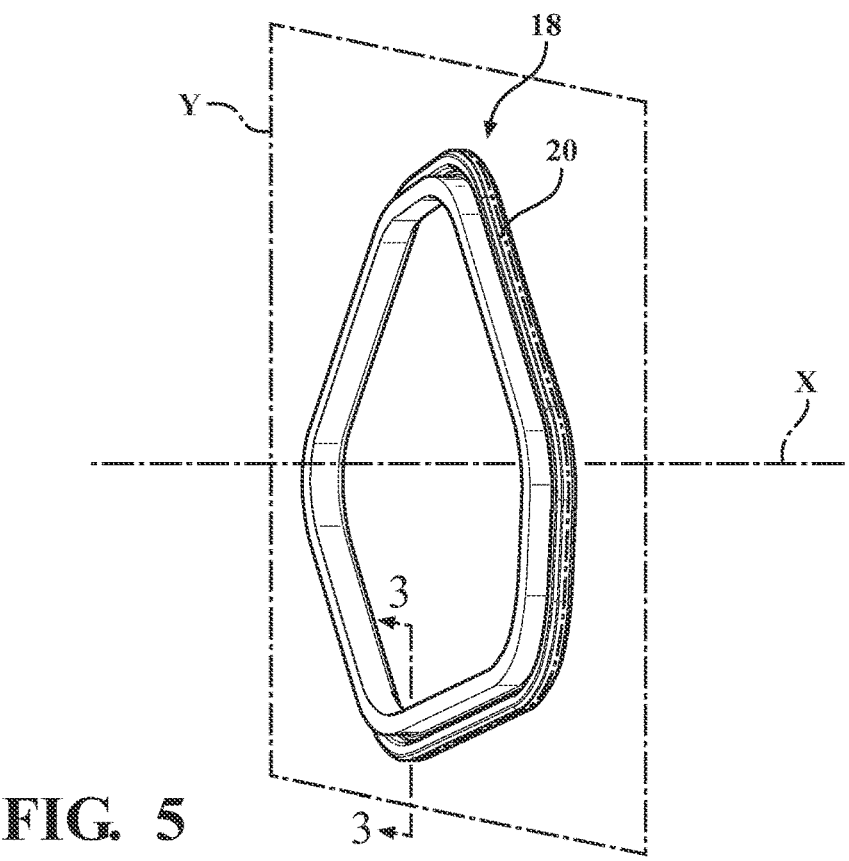
FIG. 5 is a schematic close-up perspective view of another embodiment of the PIP seal represented by the cross-sectional side view shown in FIG. 3, according to the disclosure.

As shown in FIGS. 2, 4, and 5, the PIP seal 18 has a generally cylindrical structure 20 arranged along a longitudinal axis X. The PIP seal 18 may be broadly characterized as having a reinforced structure, denoting the fact that the seal includes a compliant material section affixed or attached to a rigid support section. The cylindrical structure 20 may have a circular form (shown in FIG. 2) or an oval form (shown in FIG. 4) in a plane Y orthogonal to the longitudinal axis X. Alternatively, the cylindrical structure 20 may have an irregular contour or form (shown in FIG. 5) in the plane Y orthogonal to the longitudinal axis X to match the shape of a particular interface 10A between the first and second components 12, 14.

As shown in FIG. 1, the first component 12 and the second component 14 may define respective passages 12A and 14A for conveying a fluid therebetween. As additionally shown in FIGS. 2, 4, and 5, the cylindrical structure 20 surrounds an open inner region 20A. The open inner region 20A is configured to accept therein and center a section of the second component 14. Such a connection would generate a continuous fluid passage from the first component 12 to the second component 14, thereby facilitating transfer of a working fluid between the passages 12A, 14A. The cylindrical structure 20 is configured to be arranged within the first component 12, such as inside a formed or machined pocket 12-1, and be partially compressed by the second component 14 when the PIP seal 18 is installed within the interface 10A (shown in FIG. 6). Accordingly, during assembly of the interface 10A, the PIP seal 18 may be initially positioned within the pocket 12-1 and then be partially compressed by the second component 14 as the first and second components 12, 14 are fastened to each other.

The cylindrical structure 20 is further characterized by a stepped-shape 22 in a cross-sectional view taken along section 3-3 in FIGS. 2, 4, and 5 and shown in FIG. 3. As shown in FIG. 3, the stepped-shape 22 includes a first section 24 having a first length L1 arranged along the longitudinal axis X and a first width W1 arranged orthogonal to and extending toward the longitudinal axis. The first section 24 is configured to be compressed by the second component 14 to generate sealing pressure between the first and second components 12, 14 when the PIP seal 18 is installed within the interface 10A. The stepped-shape 22 also includes a second section 26 having a second length L2 arranged along the longitudinal axis X and a second width W2 arranged orthogonal to and extending toward the longitudinal axis. As shown, the second length L2 is longer than the first length L1, thereby imparting the stepped-shape 22 to the section 2-2 of the cylindrical structure 20. The second section 26 is affixed to the first section 24 along the first length L1 to thereby stabilize the cylindrical structure 20 in a direction along the longitudinal axis X when the PIP seal 18 is installed within the interface 10A.

Specifically, the PIP seal 18 may have an over-molded construction, where the first section 24 is over-molded on top of the second section 26. Alternatively, the first section 24 may be bonded to the second section 26 via a suitable adhesive. The second section 26 defines a generally planar surface 26A adhered to the first section 24. The second section 26 is constructed from a rigid material, such as an engineered plastic or a metal, e.g., stainless steel or aluminum. The first section 24 is formed or otherwise constructed from an elastic or compliant material. More specifically, the material of the cylindrical structure 20 may be selected to have Shore A-40 hardness.

The Shore A Hardness scale generally measures the hardness of flexible molded rubbers that range in hardness from very soft and flexible, to medium and somewhat flexible, to hard with almost no flexibility at all. Semi-rigid plastics may also be measured on the high end of the Shore A scale. The compliant material of the PIP seal 18 may be especially useful in an embodiment of the interface 10A required to withstand significant fluid pressure and retain its structural and sealing integrity. For example, in such an embodiment, the cylindrical structure 20 may be compressed to 20-35% of its thickness when the second component 14 is fastened to the first component 12.

In an embodiment where the PIP seal 18 is intended to come into contact with and seal off a particular fluid, material of the first section 24 may be selected based on its compatibility with the working fluid conveyed through the interface 10A. Additionally, material of the first section 24 may be selected to reliably withstand projected temperature range and pressure at the interface 10A. Specifically, in the interface between the first and second components 12, 14 of a motor vehicle powertrain subassembly, the temperature range may be −30 to +110 degrees Celsius. Also, such a vehicle powertrain embodiment of the interface 10A may be required to seal fluid pressure in the 350 KPa range. Furthermore, the material of the first section 24 may be selected based on its resistance to fluid diffusivity and chemical resistance to the subject fluid. Such a fluid may, for example, be moist air, Hydrogen gas, or glycol-based (~50% by volume) coolant. An exemplary material for the first section 24 which would satisfy the above requirements is Ethylene Propylene Diene Monomer (EPDM) rubber. Similar considerations may be applied to the second section 26 and the adhesive employed to maintain the bond between the first and second sections 24, 26.

The first section 24 may include a leading surface 24-1 at an intersection of the first width W1 and the first length L1. As shown, the leading surface 24-1 is configured to come into contact with the second component 14 when the PIP seal 18 is being installed within the interface 10A. The leading surface 24-1 may specifically be rounded in the cross-sectional view 3-3 to facilitate insertion of the second component 14 into the open inner region 20A surrounded by the cylindrical structure 20. The rounded leading surface 24-1 may be additionally instrumental in facilitating the first section 24 maintaining a square orientation with respect to the longitudinal axis X as the second component 14 squeezes the compliant material within the pocket 12-1 during generation of the assembly 10. Thus assembled, the first and second components 12 compress the first section 24 of the PIP seal 18 and generate a fluid-pressure joint capable of delivering reliable leak-free performance.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A press-in-place (PIP) reinforced seal for an interface between adjacent components, the PIP reinforced seal comprising:
   a cylindrical structure arranged along a longitudinal axis and characterized by a stepped-shape in a cross-sectional view, wherein the cylindrical structure is configured to be pressed into a first component and be compressed by a second component when the seal is installed within the interface, and wherein the stepped-shape includes:
      a first section having a first width arranged orthogonal to the longitudinal axis and a first length arranged along the longitudinal axis, wherein the first section is constructed from a compliant material configured to be compressed by the second component and generate sealing pressure between the first and second components when the PIP reinforced seal is installed within the interface; and
      a second section having a second width arranged orthogonal to the longitudinal axis and a second length arranged along the longitudinal axis, wherein the second section is constructed from a rigid material and is affixed to the first section along entirety of the first length to thereby stabilize the cylindrical structure when the PIP reinforced seal is installed within the interface;
   wherein:
      the second length is greater than the first length;
      the second section is arranged radially inward relative to the first section and with respect to the longitudinal axis; and
      the first section includes a leading surface at an intersection of the first width and the first length and configured to come into contact with the second component when the PIP reinforced seal is installed within the interface, and wherein the leading surface is rounded in the cross-sectional view.

2. The PIP reinforced seal of claim 1, wherein the compliant material is Ethylene Propylene Diene Monomer (EPDM) rubber.

3. The PIP reinforced seal of claim 1, wherein the rigid material is one of metal and engineered plastic.

4. The PIP reinforced seal of claim 1, wherein the compliant material has Shore A-40 hardness.

5. The PIP reinforced seal of claim 2, wherein the first section is configured to come into contact with a fluid, and wherein the compliant material is selected based on its chemical resistance to the fluid.

6. The PIP reinforced seal of claim 5, wherein the fluid is at least one of moist air, Hydrogen gas, and glycol-based coolant.

7. The PIP reinforced seal of claim 1, wherein the cylindrical structure has an over-molded construction in which the first section is over-molded on the second section.

8. The PIP reinforced seal of claim 1, wherein the cylindrical structure has one of a circular and an oval form in a plane orthogonal to the longitudinal axis.

9. The PIP reinforced seal of claim 1, wherein the cylindrical structure has an irregular form in a plane orthogonal to the longitudinal axis.

10. A fluid-pressure joint assembly comprising:
    a first component and a second component;
    a press-in-place reinforced (PIP) seal for an interface between the first and second components, the PIP reinforced seal having:
       a cylindrical structure arranged along a longitudinal axis and characterized by a stepped-shape in a cross-sectional view, wherein the cylindrical structure is configured to be pressed into a first component and be compressed by a second component when the seal is installed within the interface, and wherein the stepped-shape includes:
          a first section having a first width arranged orthogonal to the longitudinal axis and a first length arranged along the longitudinal axis, wherein the first section is constructed from a compliant material configured to be compressed by the second component and generate sealing pressure between the first and second components when the PIP reinforced seal is installed within the interface; and
          a second section having a second width arranged orthogonal to the longitudinal axis and a second length arranged along the longitudinal axis, wherein the second section is constructed from a rigid material and is affixed to the first section along entirety of the first length to thereby stabilize the cylindrical structure when the PIP reinforced seal is installed within the interface;
       wherein;
          the second length is greater than the first length;
          the second section is arranged radially inward relative to the first section and with respect to the longitudinal axis; and
          the first section includes a leading surface at an intersection of the first width and the first length and configured to come into contact with the second component when the PIP reinforced seal is installed within the interface, and wherein the leading surface is rounded in the cross-sectional view.

11. The fluid-pressure joint assembly of claim 10, wherein the compliant material is Ethylene Propylene Diene Monomer (EPDM) rubber.

12. The fluid-pressure joint assembly of claim 10, wherein the rigid material is one of metal and engineered plastic.

13. The fluid-pressure joint assembly of claim 10, wherein the compliant material has Shore A-40 hardness.

14. The fluid-pressure joint assembly of claim 11, wherein the first section is configured to come into contact with a fluid, and wherein the compliant material is selected based on its chemical resistance to the fluid.

15. The fluid-pressure joint assembly of claim 14, wherein the fluid is at least one of moist air, Hydrogen gas, and glycol-based coolant.

16. The fluid-pressure joint assembly of claim 10, wherein the cylindrical structure has an over-molded construction in which the first section is over-molded on the second section.

17. The fluid-pressure joint assembly of claim 10, wherein the cylindrical structure has one of a circular, an oval, and an irregular form in a plane orthogonal to the longitudinal axis.

18. A press-in-place (PIP) reinforced seal for an interface between adjacent components, the PIP reinforced seal comprising:
a cylindrical structure arranged along a longitudinal axis and characterized by a stepped-shape in a cross-sectional view, wherein the cylindrical structure is configured to be pressed into a first component and be compressed by a second component when the seal is installed within the interface, and wherein the stepped-shape includes:
a first section having a first width arranged orthogonal to the longitudinal axis and a first length arranged along the longitudinal axis, wherein the first section is constructed from Ethylene Propylene Diene Monomer (EPDM) rubber configured to be compressed by the second component and generate sealing pressure between the first and second components when the PIP reinforced seal is installed within the interface; and
a second section having a second width arranged orthogonal to the longitudinal axis and a second length arranged along the longitudinal axis, wherein the second section is constructed from a rigid material and is bonded to the first section along entirety of the first length to thereby stabilize the cylindrical structure when the PIP reinforced seal is installed within the interface;
wherein:
the second length is greater than the first length;
the second section is arranged radially inward relative to the first section and with respect to the longitudinal axis; and
the first section includes a leading surface at an intersection of the first width and the first length and configured to come into contact with the second component when the PIP reinforced seal is installed within the interface, and wherein the leading surface is rounded in the cross-sectional view.

19. The PIP reinforced seal of claim 18, wherein the rigid material is one of metal and engineered plastic, and wherein the compliant material has Shore A-40 hardness.

20. The PIP reinforced seal of claim 18, wherein the cylindrical structure has an over-molded construction in which the first section is over-molded on the second section.

\* \* \* \* \*